United States Patent
Priller et al.

(10) Patent No.: US 12,386,969 B2
(45) Date of Patent: Aug. 12, 2025

(54) METHOD FOR CHECKING THE SECURITY OF A TECHNICAL UNIT

(71) Applicant: AVL LIST GMBH, Graz (AT)

(72) Inventors: Peter Priller, Gratwein-Straßengel (AT); Stefan Marksteiner, Vasoldsberg (AT)

(73) Assignee: AVL LIST GMBH, Graz (AT)

( * ) Notice: Subject to any disclaimer, the term of this patent is extended or adjusted under 35 U.S.C. 154(b) by 570 days.

(21) Appl. No.: 17/618,848

(22) PCT Filed: Jun. 9, 2020

(86) PCT No.: PCT/AT2020/060234
§ 371 (c)(1),
(2) Date: Dec. 13, 2021

(87) PCT Pub. No.: WO2020/247993
PCT Pub. Date: Dec. 17, 2020

(65) Prior Publication Data
US 2022/0245260 A1    Aug. 4, 2022

(30) Foreign Application Priority Data
Jun. 14, 2019  (AT) .............................. A 50536/2019

(51) Int. Cl.
*G06F 21/57*  (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS 6,594,575 B2    7/2003   Pflügl et al.
11,017,132 B2   5/2021   Kordon et al.
(Continued)

FOREIGN PATENT DOCUMENTS

AU   2007202232 B2   5/2007
CN   109117637 A     1/2019
(Continued)

OTHER PUBLICATIONS

Blame Fabian et al. "Efficient systematic test generation for driver assistance systems in virtual environments" Jul. 10, 2013; Technical University of Braunschweig, Institute for Control Engineering & Volkswagen AG; retrieved from the Internet on Apr. 30, 2020 under the link <URL:https://publikationsserver.tu-braunschweig.de/servlets/MCRFileNodeServlet/dbbs_derivate_00031187/AAET_Schuldt_Saust_Lichte_Maurer_Scholz.pdf (20 pgs.) and English language translation from DOI:24355/DBBS.084-2013 07101421-0, Corpus ID: 187558800.

(Continued)

*Primary Examiner* — Fatoumata Traore
(74) *Attorney, Agent, or Firm* — Dykema Gossett PLLC

(57) ABSTRACT

Various embodiments of the present disclosure are directed to methods for checking the security of a technical unit, wherein at least one first plausible model variant is determined. In one example embodiment, the method includes the following steps carried out on a test computer system: assigning known vulnerabilities to components of the model variants; defining an attack aim; creating at least one attack model, based on the attack aim, for each model variant; weighting the nodes of the attack model with respect to at least one evaluation variable; determining an evaluation of at least one test vector of the attack model with respect to the evaluation variable; determining a security value as the pessimal value of all evaluations; and issuing a security (Continued)

confirmation if the security value corresponds to a security criterion.

11 Claims, 7 Drawing Sheets

(56) References Cited

U.S. PATENT DOCUMENTS

| | | | | |
|---|---|---|---|---|
| 11,652,839 B1* | 5/2023 | Aloisio | ............... | H04L 63/1433 726/25 |
| 2006/0021048 A1 | 1/2006 | Cook et al. | | |
| 2006/0021050 A1* | 1/2006 | Cook | ................... | H04L 63/1433 726/25 |
| 2008/0098479 A1* | 4/2008 | O'Rourke | ........... | H04L 63/1433 726/25 |
| 2013/0191919 A1 | 7/2013 | Basavapatna et al. | | |
| 2014/0380485 A1* | 12/2014 | Ayyagari | ............... | G06F 21/577 726/25 |
| 2018/0300567 A1* | 10/2018 | Qin | .................. | G08G 1/096791 |
| 2020/0244698 A1* | 7/2020 | Pal | ....................... | H04L 63/1466 |

FOREIGN PATENT DOCUMENTS

| | | |
|---|---|---|
| JP | 2016091402 A | 5/2016 |
| WO | 2017178015 A1 | 10/2017 |

OTHER PUBLICATIONS

Sparsh Sharma et al. "A Survey on Intrusion Detection Systems and Honeypot Based Proactive Security Mechanisms in VANETs and VANET Cloud", Vehicular Communications, vol. 12, Apr. 2018, pp. 138-164.

Keisuke Kito, Software State Transition Estimation Method for Supporting Penetration Test of Networked Control Systems, Multimedia, Distributed, Cooperative, and Mobile Symposium, IPSJ Symposium Series vol. 2018, Jul. 12, 2018, pp. 198-201, Information Processing Society of Japan.

* cited by examiner

METHOD FOR CHECKING THE SECURITY OF A TECHNICAL UNIT

CROSS-REFERENCE TO RELATED APPLICATIONS

This application is a national stage filing based upon International PCT Application No. PCT/AT2020/060234, filed 9 Jun. 2020, which claims the benefit of priority to Austria application No. A 50536/2019, filed 14 Jun. 2019.

BACKGROUND

The present disclosure relates to: a method, carried out on a test computer system, for checking the security of a technical unit; a method for determining at least one plausible configuration of a technical unit; a computer program product; and a test computer system.

From a certain level of complexity, modern technical devices, in particular vehicles, have a large number of embedded and interconnected components, each of which is provided with its own processors or microcontrollers. The present disclosure is not limited to vehicles, but can also be used in connection with other units and technical devices that have a large number of interconnected components and are generally referred to as a "technical unit" in connection with the present disclosure. Examples of technical units include, inter alia, combinations of different devices. For example, certain tasks can be performed by an autonomous computer unit, such as a tablet or smartphone, which communicates with another unit, such as an (autonomous) vehicle, e.g. as a tachograph. On the other hand, multiple vehicles can also communicate with each other, e.g. via radio, in order to carry out common tasks, for example in order to be coupled together in the sense of a virtual drawbar, or a unit, for example a special vehicle in the construction sector, for agriculture, emergency services, etc., can be connected to one or more onboard devices. Such combined units can be considered to be technical units within the meaning of the present disclosure.

The components of such a technical unit usually have their own memory and communication interfaces and they can therefore each be viewed as a separate computer system. Such components are also referred to as embedded systems (ES) or cyber-physical systems (CPS). The complexity of such technical units quickly becomes unmanageably high. For example, a vehicle usually has dozens of control units on which software with tens of millions of lines of program code is executed. The various wireless connection protocols alone, some of which are used simultaneously, can be cited as an example of communication interfaces.

Due to the complexity and the multitude of communication interfaces, such vehicles create a large attack surface for cyber attacks. Attacks can take place not only via the actual communication interfaces, but also via sensors such as a LIDAR or radar system, for example. These could be attacked with fake signals or by means of DoS/flooding, for example.

In connection with the present disclosure, a "cyber attack" is an event that has an external or internal effect on the technical unit, the aim of which is to influence the technical unit in an impermissible manner and/or to forward data from the technical unit to third parties in an impermissible manner.

Due to the physical capabilities of vehicles (mass and speed, thus high kinetic energy, direct interaction with potentially many people), the large number thereof (vehicle fleets) and the progression toward autonomous vehicles, such attacks can develop an enormous risk potential. This applies not only to the large number of land vehicles, such as cars, trucks or rail-bound vehicles, but also to watercraft or aircraft.

The present disclosure aims to secure such vehicles and other technical units against cyber attacks and to contribute to their resilience. In connection with the present disclosure, "resilience" refers to the ability of a technical unit to continuously produce the intended result regardless of any influencing events (such as cyber attacks).

In order to secure technical units against cyber attacks and make them resilient, it is important to prevent vulnerabilities in development as far as possible, or to isolate individual components that may be at risk as far as possible and to take redundant security measures. In the conceptual phase, this is achieved through architectural measures (as described, for example, in "Secure Vehicular Communication Systems: Design and Architecture" by Papadimitratos, P., Buttyan, L., Holczer, T., Schoch, E., Freudiger, J., Raya, M., Ma, Z., Kargl, F., Kung, A., & Hubaux, J.-P., 2008, IEEE Communications Magazine, 46(11), 100-109) during the implementation of the concept through appropriate development processes, such as best practice, source code review, etc.

After the technical unit has been fully assembled and the components have been integrated into it, there is always a need for a test or a security check in order to be able to find all relevant vulnerabilities (including those that arise only through the combination of the sub-systems). Such a security check is also known as a cybersecurity test.

In order to be able to find a vulnerability, it is helpful to have knowledge of the component's existence (however, there are also techniques for finding vulnerabilities that do not require prior knowledge, such as fuzzing). The vulnerabilities on which a security check is based can be obtained, for example, from databases that are freely accessible to the public or that are subject to a charge, or from internal databases. Internal databases can contain vulnerabilities discovered in the course of in-house vulnerability analyzes; some previously undiscovered vulnerabilities are also offered on the darknet for a fee.

The security check should allow manufacturers (e.g. original equipment manufacturer (OEM)), government agencies (e.g. regulatory authorities), and other stakeholders (e.g. consumer associations, commercial fleet operators, etc.) to assess the specific cybersecurity risk of a technical unit or vehicle. This can be used for the further development or improvement of vehicles, for acceptance or certification and similar tasks.

For example, security checks are required both during the development of a new vehicle by the OEM, during the market launch/typification/homologation, and then continuously throughout the life of the vehicle. The need for a repeated security check at the system test level and thus the ongoing review of cybersecurity arises due to changeable configurations, ongoing updates of (parts of the) software, changed environmental conditions (e.g. vehicle-to-infrastructure (V2I), vehicle-to-vehicle (V2V): changes in interaction partners), newly discovered test vectors (also from in-house security research), etc. The security check can be carried out by manufacturers, and possibly also by (fleet) operators, regulatory authorities and specialized third-party companies.

Due to the distributed development, production, configuration and maintenance in the automotive value chain, knowledge about the specific internal implementation of the technical unit cannot be accessed during the security check, or can be done only to a very limited extent. The system architecture, configuration data, source codes, etc. of the technical unit to be tested are hardly known, especially for a security check by actors other than the manufacturer itself, such as by users or authorities. The security check therefore largely corresponds to "black box testing" or "gray box testing," i.e. tests that are developed with little or no knowledge of the internal functioning or implementation of the unit to be tested.

This results in the problem of selecting the appropriate test cases and test or attack vectors for the security check. Due to the high complexity and the combinatorial diversity, there is an extremely high number of test cases that cannot be fully processed in the real time available, even with high-quality computer systems.

The present invention therefore has the object of providing methods and devices with which the number of test cases to be checked can be reduced to a technically manageable level. Furthermore, the security check is intended to be largely automated.

SUMMARY OF THE INVENTION

These and other objects are achieved by a method for determining at least one first plausible model variant of a configuration of a technical unit by means of a test computer system, wherein the technical unit has at least one data transmission device and a multitude of components which are capable of data communication via the data transmission device, and wherein the method comprises the following steps:
- establishing a connection between a test interface of the test computer system and the data transmission device of the technical unit,
- determining an initial instance of a model of the configuration of the technical unit,
- developing specified instances of the model starting from the initial instance through a sequence of specification processes, each of which has at least the following steps:
  - carrying out a challenge action if necessary,
  - determining a behavior which is characteristic of the technical unit,
  - analyzing the characteristic behavior and inferring at least one feature of the actual configuration of the technical unit,
  - specifying the model with the at least one determined feature,
- wherein at least one specification process is carried out automatically by the test computer system, and
- identifying a specified instance of the model as a first plausible model variant if at least one certainty condition is met.

With the aid of this method, it is possible to reduce the combinatorial diversity of test cases that have to be tested for a security check to a number that can be fully processed by means of the test computer system in an available period of time in order to verify that there is a security confirmation for the technical unit.

In connection with the present disclosure, a "component" of the technical unit is a unit provided with at least one electronic circuit (in particular an integrated circuit, possibly with a processor, microcontroller, an FPGA, an artificial neural network, or the like) which has a data communication capability and which, directly or indirectly, is connected to at least one data transmission device of the technical unit. According to the present disclosure, the components can also be referred to in a narrower sense as "electronic components" or "data processing components."

In connection with the present disclosure, a "sub-component" of the technical unit is a component which is either connected to a single component or which—regardless of the type of data communication—is assigned to a single component.

In connection with the present disclosure, "data transmission devices" generally refer to means that allow data to be transmitted from a sender (e.g. a component, sub-component or an external data source) to a receiver (e.g. a component, sub-component or an external data sink). Data transmission devices can either be wired or wireless, with the data communication being carried out via the relevant data transmission device in accordance with a defined connection protocol. Examples of wireless connection protocols include, but are not limited to, 3G/4G/5G cellular networks, Bluetooth, WLAN, V2X, RFID, etc. Examples of wired connection protocols include, for example, CAN, FlexRay, MOST, (automotive) Ethernet, etc.

In connection with the present disclosure, a "test computer system" is any computer system via which the corresponding steps of the method disclosed herein are carried out.

In connection with the present disclosure, a "test interface" is a data connection between the test computer system and the data transmission device of the technical unit. The test interface can use any connection protocol that allows such communication. For example, the test interface can be a wireless or wired interface. The test interface can optionally also support several different connection protocols, for example if the connection protocol used by a data transmission device of the technical unit is initially unknown. For example, USB interfaces, Bluetooth interfaces or diagnostic interfaces of the technical unit can be used as interfaces. The establishment of a connection between the test interface and the data transmission device can take place for example via conventional plug connections, or wirelessly. In this context, "establishment of a connection" means any process that allows the test computer system to communicate with the data transmission device. If necessary, the test computer system can have multiple test interfaces that are independent of one another.

In connection with the present disclosure, a "configuration" is a defined group of features of the technical unit, and the group can in particular contain the following features:
- number and type of existing components and/or sub-components
- model information of existing components and/or sub-components
- number and type of existing data transmission devices
- connection protocol of existing data transmission devices
- physical arrangement of a component and/or sub-component in the technical unit
- communication capability of a component via one or more data transmission devices
- number and type of sub-components of a component
- identification and version information of firmware that is present on a component or sub-component
- identification and version information of software that is present on a component or sub-component
- communication links of components and/or sub-components
- mutual functional dependencies between components and/or sub-components (e.g. component A does not work without component B)

(possibly distributed) responsibility of components and/or sub-components for a function of the overall system (for example the control of or the interaction of multiple control chips on the braking system of a vehicle)

component versions (hardware, software, firmware)

version and revision number of chips any meta information (e.g. manufacturer)

timing information, such as clock frequency, transmission speed, runtime (computing time), periods of cyclical tasks, etc.

software configuration (e.g. task priority, assigned memory areas, etc.).

In connection with the present disclosure, a "model" or "configuration model" is a systematic representation of the configuration of the technical unit, possibly taking into account units assigned to the technical unit. Depending on the level of detail, the model can include some or all of the features defined for the configuration. A model can, on the one hand, comprise features of the technical unit whose correspondence with the real technical unit has been confirmed; on the other hand, the model can also comprise features whose correspondence with the technical unit has not been confirmed. The model can also contain "unknowns" or "placeholders" for features that are known to be present in the technical unit, but whose precise identity is not known. In this context, an unknown is a variable that is not assigned a value. A generic model node to which features are assigned without specific information is referred to as a placeholder. Such placeholders can be used, for example, for components which are known to have to be present in the technical unit, but for which it is not known which series of the component is involved or where exactly the component is located. Placeholders can also be used for other features of the technical unit, such as software, firmware, data transmission devices, etc.

The representation or design of the model can be chosen as desired, wherein a structured design in which features of associated units (such as a component) are combined into model nodes and in which relationships between the components (e.g. hierarchical dependencies, data flows, control flows, etc.) can be represented as connections between the model nodes (herein generally referred to as "connection edges"). The modeling can be based on any suitable system, but a simple structure, for example a hierarchical arrangement of the model nodes in a tree structure or an arrangement in a network structure, is sufficient for the present teachings and reduces the complexity of the models to a manageable extent. However, the present disclosure is not restricted to these structures, since other structures can also be used for the modeling.

For certain tests, it is also necessary to include components in the model that are not actually part of the technical unit per se, but that are interrelated with the technical unit. The term "technical unit" is to be interpreted broadly in this case and can also include such "external" components.

For example, the technical unit to be analyzed and modeled may be a vehicle which requires a communication partner for certain functions, however. This communication partner can be, for example, a second vehicle (in the case of V2x, vehicle-to-everything) or, in the case of networked vehicles, an application that runs in the cloud (V2C, vehicle-to-cloud). If necessary, such communication partners or components thereof can be included in the modeling of the technical unit, and the components and features of these "external" communication partners may be used in connection with the methods disclosed herein analogously to the components and features of the actual technical unit.

In connection with the present disclosure, a "first plausible model variant" is a configuration model that corresponds to a certainty condition. While it is not possible to confirm with certainty that the plausible model variant corresponds to the actual configuration, it is also not possible to rule out the possibility that it corresponds to the actual configuration of the technical unit in question. Plausible model variants can also contain "placeholders" of components.

In connection with the present disclosure, an "initial instance of the model" refers to a model which is usually incomplete, but from which it is presumed that as many known features of the model as possible correspond to the actual technical unit. The model can also contain unknowns or placeholders for features that have not yet been identified. The initial instance can be a generic model of the technical unit, for example. If necessary, a more specific model than the initial model can also be selected, for example on the basis of prior information, such as a type designation of the technical unit. The initial instance can be determined before or after the connection between the test computer system and the technical unit is established. For example, an initial instance of the model can be selected from a database on the basis of a user input into the test computer system (for example a type designation of the technical unit). Optionally, the initial instance can also be selected independently by the test computer system on the basis of data that were received from the technical unit after the connection was established. Optionally, for determining the initial instance, predefined test cases can also be carried out on the technical unit in order to determine the initial instance on the basis of experience with similar technical units.

In connection with the present disclosure, a "specified instance of the model" is a modified version of the model that has a higher correspondence with the actual technical unit than the initial instance (and possibly than the previously specified instances).

In connection with the present disclosure, a "specification process" refers to the generation of a specified instance of the model from the initial instance or from a previous specified instance. "Developing specified instances of the model" refers to an iterative sequence of specification processes.

In connection with the present disclosure, "carried out automatically" means that the test computer system carries out the corresponding process without the need for user intervention. The general intention is to reduce the number of user interventions required to the minimum.

In connection with the present disclosure, a "challenge action" refers to an action that is expected to cause a characteristic behavior of the technical unit, for example characteristic data communication via the data transmission device of the technical unit. A challenge action can be, for example, data traffic that is transmitted from the test computer system to the data transmission device via the test interface. If necessary, the test computer system can also bring about challenge actions via other interfaces, and e.g. actuators can be used that act on parts of the technical unit. If necessary, the test computer system can also instruct the user to carry out certain challenge actions, such as actuating control elements of the technical unit or manipulating a component in a certain way. A challenge action can be specially designed data communication or a cyber attack carried out on a test basis, for example. Optionally, purely passive observation of the technical unit can also take place instead of the challenge action.

In connection with the present disclosure, "behavior which is characteristic of the technical unit" means any behavior from which conclusions can be drawn about at least one feature of the configuration of the technical unit. The characteristic behavior can be, for example, the occurrence of a specific type of data communication via the data transmission device or a specific measurement value which is characteristic of the technical unit or components of the technical unit. For example, by measuring the impedance of a line that is used as a data transmission device, conclusions can be drawn about the number of components that are connected to this line. The characteristic behavior can also be determined using any other measurements.

The analysis of the characteristic behavior and inference of at least one feature of the actual configuration of the technical unit can take place, for example, by querying a database in which the characteristic behavior of known technical units or components are stored. The database can either be external or integrated into the test computer system and can optionally be automatically updated by the test computer system.

In connection with the present disclosure, a "certainty condition" is used to denote a condition which establishes that an instance of the model is sufficiently certain to allow a security check to be carried out within a specified time. For example, it can be assessed how many variants of actually possible configurations (or model variants) exist based on the instance. For example, the certainty condition could require that the number of possible variants of an instance is below a certain threshold value. However, more complex certainty conditions are also possible. For example, the certainty condition can also take into account how successful the specification processes last carried out were in order to avoid stopping the development of the specified instances too early. The certainty condition can, if necessary, also take into account that the number of model variants can be further restricted in the course of performing the security check.

In an advantageous embodiment of the method disclosed herein, the step of determining a behavior which is characteristic of the technical unit can comprise the interception of data transmitted via the data transmission device by the test computer system. This interception can be used to determine numerous features of the actual configuration of the technical unit, if necessary following a challenge action.

Advantageously, features of the actual configuration of the technical unit can be selected from at least one feature of a component and/or at least one relationship between components. The relationship can be, for example, a functional relationship or a communication relationship. Features of a component can be, for example, a type designation of the component and/or a model version of the component and/or a firmware version and/or software running on the component and/or its version. A functional relationship between components can be, for example, the arrangement of components communicating with one another on specific data transmission devices, the circumstance of by which component a certain a piece of software is executed, or the participation of multiple components in a superordinate function. The "superordinate function" can be a jointly achieved effect, for example. For example, multiple sensors can contribute to a braking system. However, they do not necessarily have to communicate with one another. Their data could be processed by another unit (possibly even not yet discovered in the specific model).

In a further advantageous embodiment of the method disclosed herein, at least one alternative model variant and preferably a multitude of alternative model variants are created on the basis of the first plausible model variant. This makes it possible, in a subsequent security check, to take into account components and features that could not be found in the course of developing the specified instance. In the process, several speculative assumptions are made for unknown features, and a model variant is created for each assumption. Depending on the computing capacity of the test computer system and the complexity of the technical unit, the total number of alternative model variants may be so high that they exceed the limits of what is mentally comprehensible and are no longer amenable to "manual" processing. Nevertheless, the number of alternative model variants is small enough to be subjected to a computer-aided analysis in a reasonable amount of time, for example in the course of a security check.

In connection with the present disclosure, an "alternative model variant" is thus a modification of the first plausible model variant in which at least one unknown feature or a "placeholder" of the configuration is replaced by at least one specific feature whose properties are known, but for which it is not known whether it is present in the actual configuration of the technical unit. Alternative model variants can also have multiple components by means of which one component is jointly realized, for example, instead of a single component. Alternative model variants can e.g. be completely defined, i.e. all placeholders and unknowns can be replaced by speculative but specific assumptions. In connection with the present disclosure, a "speculative assumption" is a specific feature of the configuration whose actual implementation in the technical unit has not yet been confirmed.

In a further aspect, the present disclosure relates to a method, carried out on a test computer system, for checking the security of a technical unit, wherein at least one first plausible model variant and optionally a number of alternative model variants are determined, and wherein the method comprises the following steps:

assigning known vulnerabilities to components of the model variants,
defining an attack aim,
determining at least one attack model, based on the attack aim, for the model variants,
weighting the nodes of the attack model with respect to at least one evaluation variable,
determining an evaluation of at least one test vector of the attack model with respect to the evaluation variable,
determining a security value as the pessimal value of all evaluations and
issuing a security confirmation if the security value corresponds to a security criterion.

The method thus allows a statement to be made about the security of the technical unit even if not all components and features of the configuration of the technical unit are known. The method can be carried out largely automatically, so that the training effort for users can be minimized.

In connection with the present disclosure, a "vulnerability" refers to a path that is present in the technical unit, but is perhaps undetected, through which a cyber attack is possible. This can mean that an evaluation of a test vector of an attack model no longer corresponds to a security criterion.

In connection with the present disclosure, a "security check" is a process in which it is confirmed (or denied) that the tested technical unit complies with certain security requirements. For example, the security requirement may specify that one or more attack aims have a security confirmation.

In connection with the present disclosure, an "attack aim" is an event that may be intended by an attacker. An attack aim may be, for example, to gain control over the software functions of a component or to damage certain components. Practical examples of an attack aim in the vehicle environment include manipulating the engine control unit, changing the injection control or the like. An attack aim usually forms the initial node of an attack model (for example an attack tree or network).

In connection with the present disclosure, an "attack model" is the model description of an attack in which, starting from an initial node (the attack aim), points are assigned as to how this attack aim can be achieved. These points form nodes which are assigned to the initial node and to which further nodes can be assigned in levels. In particular, the model has a tree-like or network-like structure. The concept of attack models is well known in the art and was used, for example, in the form of "attack trees" in the publication "Attack trees" by Schneier, B. (1999), Dr. Dobb's journal, 24(12), 21-29 or in the form of attack nets in the publication "Attack Net Penetration Testing" by McDermott, J. P. (2000), Proceedings of the 2000 workshop on New security paradigms, 15-21 and in "Software fault tree and colored Petri net-based specification, design and implementation of agent-based intrusion detection systems" by Helmer et al. (2007), International Journal of Information and Computer Security, 1(1), 109-142; a (non-exhaustive) overview of attack models is offered by "An empirical evaluation of the effectiveness of attack graphs and fault trees in cyber-attack perception" by Lallie, H. S., Debattista, K., & Bal, J. (2017), IEEE Transactions on Information Forensics and Security, 13(5), 1110-1122. Since then, the concept of attack models has been defined or expanded in relevant publications. In connection with the present disclosure, it is assumed that a person skilled in the art has a sound knowledge of the concept of attack models.

An attack path extending from a node assigned in the level hierarchy of the attack model to the initial node is referred to in connection with the present disclosure as a "test vector" (or also "attack vector") and defines a sequence of steps that are required to achieve the attack aim.

Each node of the attack model is weighted with an evaluation variable that represents the effort that an attacker has to make to execute the node. The evaluation variable can be interpreted as a cost or price, with the unit of the evaluation variable being defined e.g. in time, money, manpower, in other resources or in combinations thereof.

The nodes of attack models are usually assigned to a defined sub-unit of the test unit, for example a specific component or specific software that has to be manipulated in order to overcome the node.

In connection with the present disclosure, an "evaluation of the test vector" refers to the sum of all evaluation variables of the nodes of a test vector. The evaluation can thus be interpreted as the effort that is necessary to carry out an attack along a test vector. Since each attack model comprises numerous test vectors, the worst or pessimal value of the evaluations of all test vectors of all attack models tested is of interest for assessing the security. This pessimal value defines the test vector that can be carried out with the least amount of effort. In connection with the present disclosure, the value that defines the least amount of effort for a successful attack is referred to as "pessimal."

This pessimal value of all evaluations of the test vectors of an attack model is referred to as a security value in connection with the present disclosure. The security value defines the minimum effort required to achieve the attack aim. If the security value meets a defined security criterion, then the security of the attack model can be confirmed.

In connection with the present disclosure, a "security criterion" is thus a condition that a security value must meet so that the security can be confirmed. For example, a threshold value can serve as a condition, e.g. an effort (defined e.g. in money, time, manpower, etc.) below which the security value must not lie.

In connection with the present disclosure, a "security confirmation" is a statement that indicates that the tested technical unit is to be regarded as secure (i.e. in accordance with a defined security criterion) with regard to the attack aim and the defined security value.

The method can advantageously further comprise the following steps:
  carrying out at least one cyber attack on the technical unit, selected on the basis of the identified vulnerabilities,
  evaluating the effect achieved with the cyber attack and eliminating model variants for which the effect achieved is inconclusive.

This allows the number of model variants to be further reduced during the test, and knowledge of the actual configuration can be expanded.

In the event of a cyber attack, for example, an exploit is selected and executed on the basis of a test vector. In connection with the present disclosure, an "exploit" is a sequence of commands or actions that track an attack aim along a path of an attack model (i.e. along a test vector). Exploits use known vulnerabilities. In addition to exploits, a cyber attack can also include fuzzing. In connection with the present disclosure, the term "fuzzing" refers to the automated (mass) execution of random actions (for example the mass import of random data via a data transmission device), with the aim of encountering previously unknown vulnerabilities and exploiting them.

The effect of the cyber attack can be, for example, that the attack is successful, that the attack fails, or that information is obtained in some other way that allows conclusions to be drawn about the configuration. If an attack is successful, conclusions can be drawn about the entire chain of hardware and software elements involved and knowledge about the actual configuration of the technical unit can be expanded considerably.

"Eliminating" model variants in this context means that the corresponding model variants are no longer taken into account for the further security check, since it is known that they do not correspond to the actual configuration of the technical unit. This can be recognized, for example, either directly by the fact that a specified component actually has a different configuration or also indirectly by the fact that a model variant has components or configurations which become implausible due to a detected configuration of another component.

The method can advantageously further comprise the following steps:
  determining at least one piece of software and/or firmware that is installed on a component of the technical unit,
  updating the software and/or firmware with the test computer system.

This can be used, for example, to automatically correct security deficiencies that can be remedied by updating the corresponding software and/or firmware to a newer version. The security check can then be continued with the update according to specified model variants (i.e. model variants that take the update into account).

In connection with the present disclosure, "software" refers to all non-technical, non-physical functional components of a computer. In a narrower sense, software refers to data structures, including programs, documentation and any associated data.

In connection with the present disclosure, "hardware" refers to the physical components (i.e. the electronic and mechanical components) of the technical unit.

In connection with the present disclosure, "firmware" refers to software that is permanently assigned to specific hardware (in particular to a specific component of the technical unit) and fundamentally determines the functionality of this hardware, with the hardware not being usable without the firmware. Firmware can usually only be exchanged using special means or functions.

In a further advantageous embodiment, the method can further comprise the following steps:
  determining a piece of software and/or firmware that is installed on a component of the technical unit,
  creating simulated model variants that contain a specified version of the software and/or firmware,
  determining a security value on the basis of the simulated model variants.

In connection with the present disclosure, a "simulated model variant" is a model variant which differs in a known manner from the actual configuration of the technical unit. In particular, the simulated model variant can differ from the actual one with regard to the version of the software and/or firmware.

In an analogous manner, it is also possible to "exchange" hardware (e.g. components of the technical unit) in simulated model variants for other hardware and to check the effects on security in a simulation.

With the aid of the simulated model variants, forecasts and security recommendations can be drawn up, which can also be implemented immediately if necessary.

The technical unit can advantageously be a vehicle, and in particular an automated or autonomous vehicle according to one of the SAE levels 0 to 5 according to the SAE J3016 standard. This information relates to the SAE J3016 standard in the version valid at the time of the priority date of this application.

In a further aspect, the present disclosure relates to a computer program product which can be loaded directly into the internal memory of a digital computer and which comprises software code portions with which the steps of the method disclosed herein are carried out when the product runs on the computer.

The disclosure also relates to a test computer system on which such a computer program product runs.

BRIEF DESCRIPTION OF THE DRAWINGS

The present invention is described in greater detail in the following with reference to FIGS. 1 to 7, which show advantageous embodiments of the invention by way of example, schematically, and in a non-limiting manner. In the drawings.

DETAILED DESCRIPTION

Figure 1:
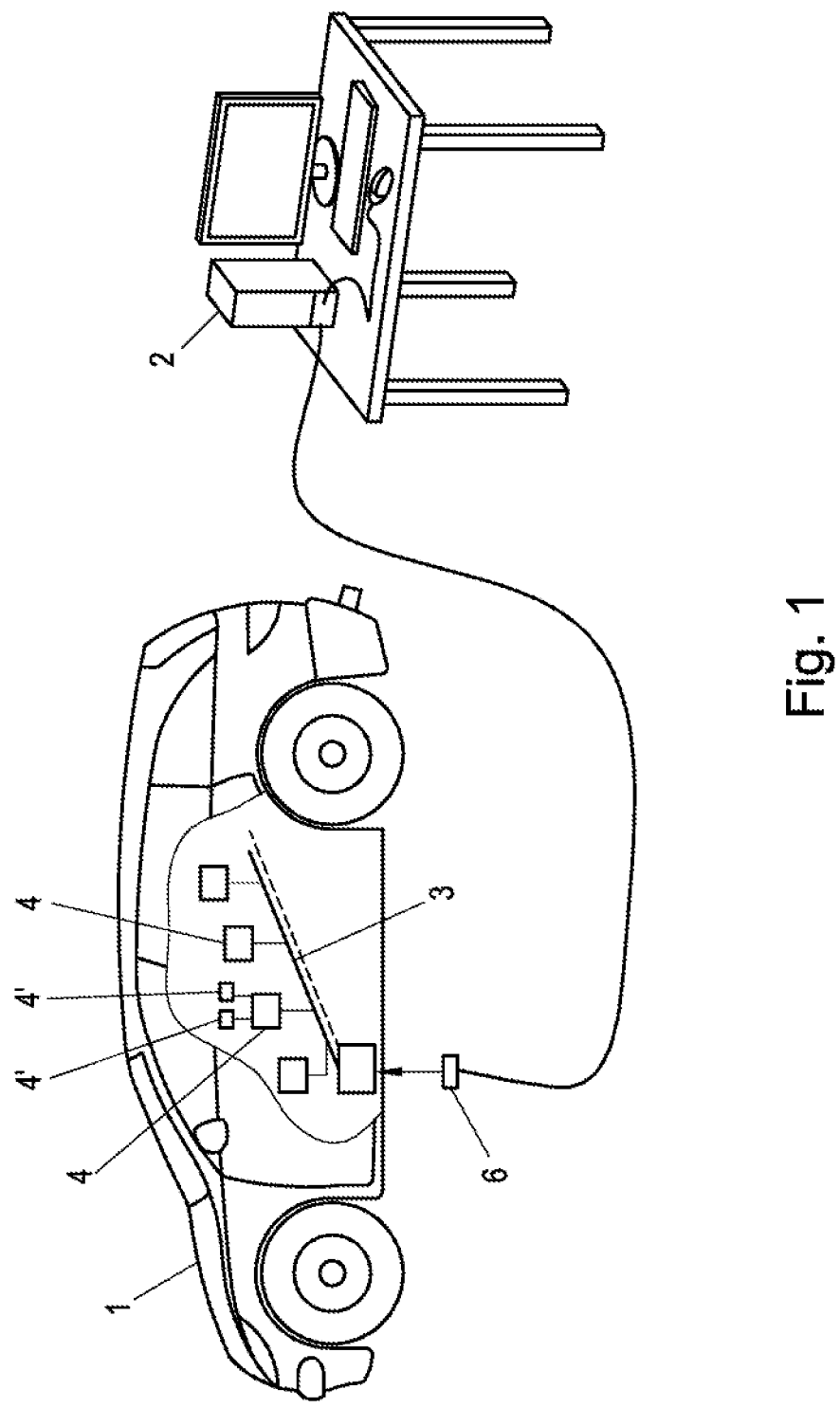
FIG. 1 schematically shows a technical unit and a test computer system.

FIG. 1 schematically shows a technical unit 1 and a test computer system 2 which can be interconnected via a test interface 6.

The test computer system 2 can be a conventional computer system on which a computer program product is executed which comprises software code portions with which the steps described herein are carried out by the test computer system 2 when the computer program product runs on the test computer system 2. The test computer system 2 can comprise, for example, at least one display, such as a computer screen, and input devices, such as a mouse, a keyboard, a touchpad and/or input and output devices specific to the application, as well as corresponding peripheral devices. The test computer system 2 has a test interface 6 by means of which data communication with a data transmission device 3 of the technical unit 1 is possible.

The test interface 6 can have a cable with a plug that can be plugged into a socket provided on the technical unit 1 in order to establish a physical connection with the data transmission device 3. The socket can be, for example, a diagnostic interface of the vehicle or another interface, such as a USB connection. If necessary, the test interface 6 can also be a wireless interface which establishes a connection to a wireless data transmission device 3 by means of a corresponding connection protocol.

The data transmission device of the technical unit 1 can be connected to a large number of components 4, the configuration of which may initially be largely unknown. The configuration can in particular be defined by the features that relate to the components 4, data transmission device(s) 3 and their arrangement and mutual relationships. In FIG. 1, for the sake of clarity, only a single data transmission device 3 (for instance in the form of a bus system, such as a CAN bus) is shown, but it can be assumed to be known that a technical unit 1 can have a plurality of different and possibly interconnected data transmission devices 3 to which different components can be connected. If necessary, the test computer system 2 can have multiple test interfaces 6, each of which is assigned to a different data transmission device 3 of the technical unit. The components 4 can optionally have sub-components 4' that are not connected directly to the data transmission device 3, but rather directly to a component 4.

In connection with the illustrations in FIGS. 2 to 5, the following describes, by way of example, the application of a method with which the (initially often largely unknown) configuration of the technical unit 1 can be modeled with the aid of the test computer system 2 in such a way that a finally obtained model 5 (this is referred to as the "first plausible model variant") is amenable to a security check. In doing so, it should be possible to carry out the security check in an economically rational manner. In the context of security checks on vehicles, a security check should be possible within a few working hours. Deep scans may also take longer, for example several days, but require human interaction only occasionally or not at all. The scale of the economic rationality depends on the particular application:

A relatively large effort may also be worthwhile for checking the security of new technical units and technical units in the development stage. A routine security check of an already registered road vehicle, for example, should be able to be completed much faster where feasible. Under favorable circumstances, a security check could be completed within an hour or less, and possibly even within a few minutes.

The example of such modeling described below is based on a motor-driven vehicle (e.g. an electric vehicle, a vehicle with a combustion engine, a vehicle with a hybrid drive, a vehicle with fuel cells, etc.). Initially, the tester (or the user of the test computer system) only knows basic data about this vehicle, for example that the vehicle has an electric motor or an internal combustion engine, which vehicle model it is, etc. This information can be entered into the test computer system 2 by the user, or if necessary the test computer system 2 can also automatically determine such information once the connection via the test interface 6 has been established. The basic data can also include a mix of information that is entered directly (e.g. "has a driver assistance system") and information that is determined indirectly (e.g. by specifying the vehicle identification number (VIN), many of these attributes could be retrieved automatically from a database). On the basis of this basic information, the test computer system 2 can select an initial instance 100 of a model 5, as is shown schematically in FIGS. 2 and 3. The initial instance 100 of the model 5 can be selected e.g. from a library of possible templates for the corresponding technical unit 1, for example from a library of possible templates for networked vehicles.

The model 5 depicts the structure or configuration of the technical unit 1 hierarchically, with the case shown being based on a tree structure. In the tree structure, the individual features are summarized in model nodes (1000, 1001, etc.), which can comprise, for example, individual components or sub-components.

The model 5 is constructed in multiple hierarchical levels, with the hierarchical and/or other relationships between individual model nodes being represented by connection edges 10 which, for example, represent the structure of functional dependencies (for example between a system and a sub-system). The design of the model and its relationships can, however, also be structured differently as desired, for example according to physical connections to an input node that is directly connected to the test interface 6 as the root of the tree. The top hierarchical level forms an identification level 201 which identifies the modeled technical unit 1 in the top model node 1000 (for example as a vehicle type and chassis number). The model variant is identified below in the model node 1001. Each model 5 can have multiple variants, as is indicated by the model node 1001' shown in dashed lines. The structure and properties of the model variants are described below in particular in connection with FIGS. 6 and 7.

The next hierarchical level can be referred to as a component level 202. The individual components 4 of the technical unit 1 are represented therein, with, for example, a model node 1002a representing a first component 4 and the further model nodes 1002b, 1002c, etc. representing further components 4 of the technical unit. Examples of such components include the engine control unit, the vehicle dynamics controller, driver assistance systems, the instrument cluster controller, etc.

Below this, a sub-component level 203 is provided whose model nodes 1003a, 1003b, etc. relate to sub-components which are each assigned to an individual model node of the component level 202.

The lowest hierarchical level can be referred to as an interaction level 204. The model nodes 1004a, 1004b, etc. listed therein can each relate to actuators, sensors, user interfaces, etc. The model nodes 1004 of the interaction level 204 are each assigned to a hierarchically superordinate model node, it being possible for them to be assigned either to a model node of the sub-component level 203 or a model node of the component level 202 (the second option is not shown in FIG. 2).

The names of the individual hierarchical levels are used for illustration purposes only and are in no way to be interpreted restrictively. In particular, all model nodes can be viewed as "components" of the technical unit 1 and the model could also have more or fewer levels.

The connection edges 10 can represent, for example, a hierarchical arrangement or hierarchical dependencies, other relationships and/or data communication paths. In general, a large number of features can be defined with the aid of the model nodes and the connection edges 10 of the model 5 shown in FIG. 1, which features include, for example, the following information:
- system sections and system boundaries,
- interfaces, sensors, actuators,
- functionalities (such as implemented functions, protocols, standards, etc.),
- descriptions of the technical implementation, such as
  - information about software, included libraries, runtime environment, etc., with precise information about the relevant version and details regarding the creation tool (compiler, linker, etc.), details regarding debugger information, etc.
  - hardware (chip manufacturer, revision, etc.), details regarding debugger interfaces (JTAG), etc.
- data paths between components The initial instance 100 of the model 5 can have incomplete information about particular features and model nodes, which are referred to as unknowns or placeholders.

The initial instance 100 of the model 5 can have a further display level that is independent of the hierarchical structure, for example in order to display data flows and communication relationships that can occur between the individual model nodes. Such a data flow 11 is shown for example in FIG. 3 by a dot-and-dash line.

Translated to a practical application, the data flow 11 can relate, for example, to the transmission of the current engine speed from an engine control unit (ECU) to a transmission control unit (TCU). The engine control unit can be represented by the model node 1002a, for example. This contains, via the model node 1003a of a sub-system (representing e.g. a sensor and interface control), a measurement value obtained from a speed sensor represented by the node 1004a. The engine control (model node 1002a) transmits the measurement value (or data derived from the measurement value) to the node 1003b, which in turn forwards the data to the model node 1003a. In this example, the node 1003b could be for instance a measurement node (and include, for example, an analog-to-digital conversion) or could carry out measurement value pre-processing (e.g. scaling). It is possible that the (physical) sensor represented by the node 1004a and the unit (e.g. measurement pre-processing) represented by the node 1003a are installed in a common housing, but can nevertheless logically be considered separately and therefore also modeled as such. The data are then transmitted to the model node 1004c, which represents a CAN interface, for example. The model node 1004c then forwards the data via the CAN bus to the transmission control unit, which is represented by the model node 1002c.

Numerous other possible data flows and communication connections can be represented in the model 5 in an analogous manner.

Figure 2:
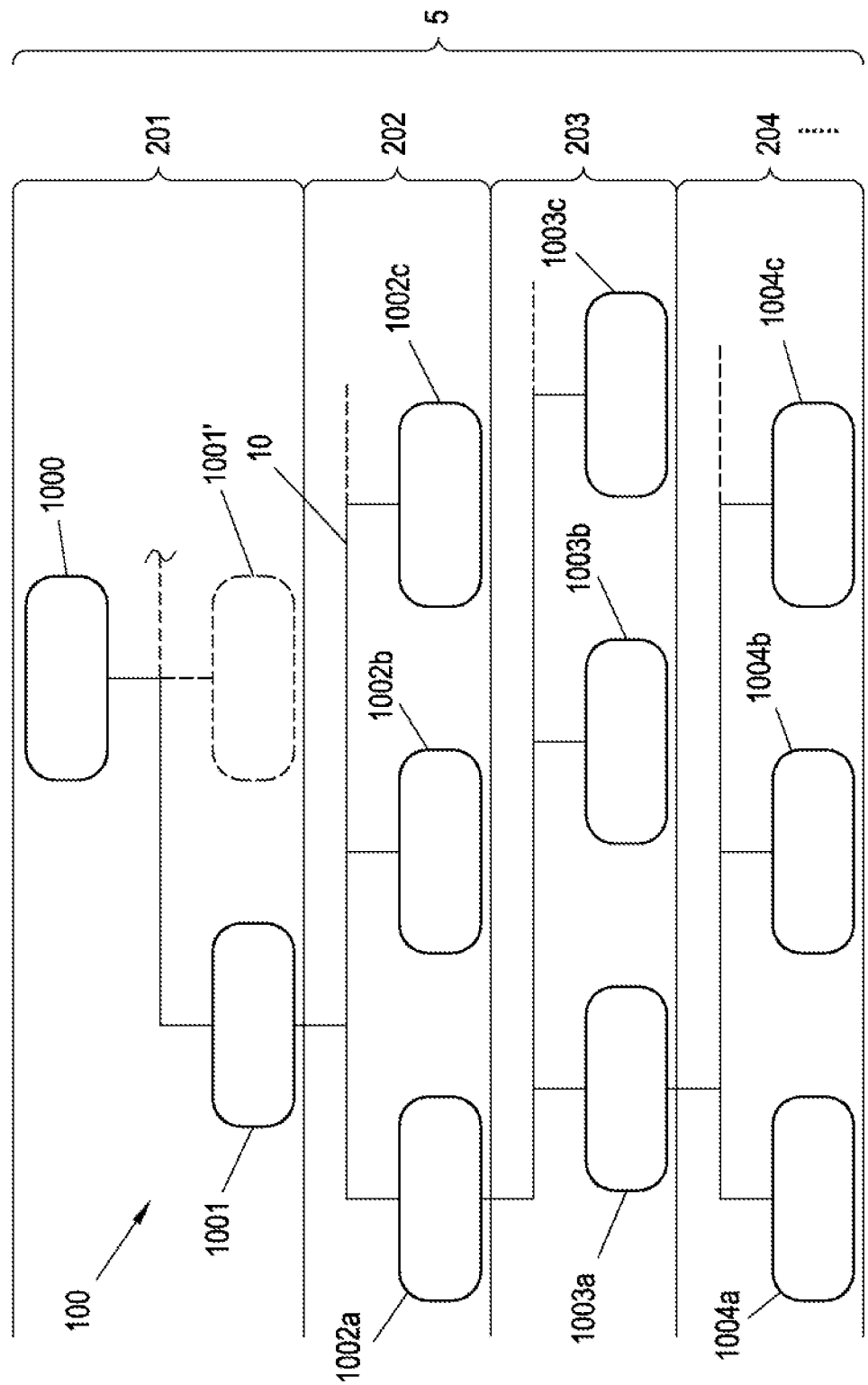
FIG. 2 shows an exemplary block diagram of an initial instance of a model of the configuration of the technical unit.
Figure 3:
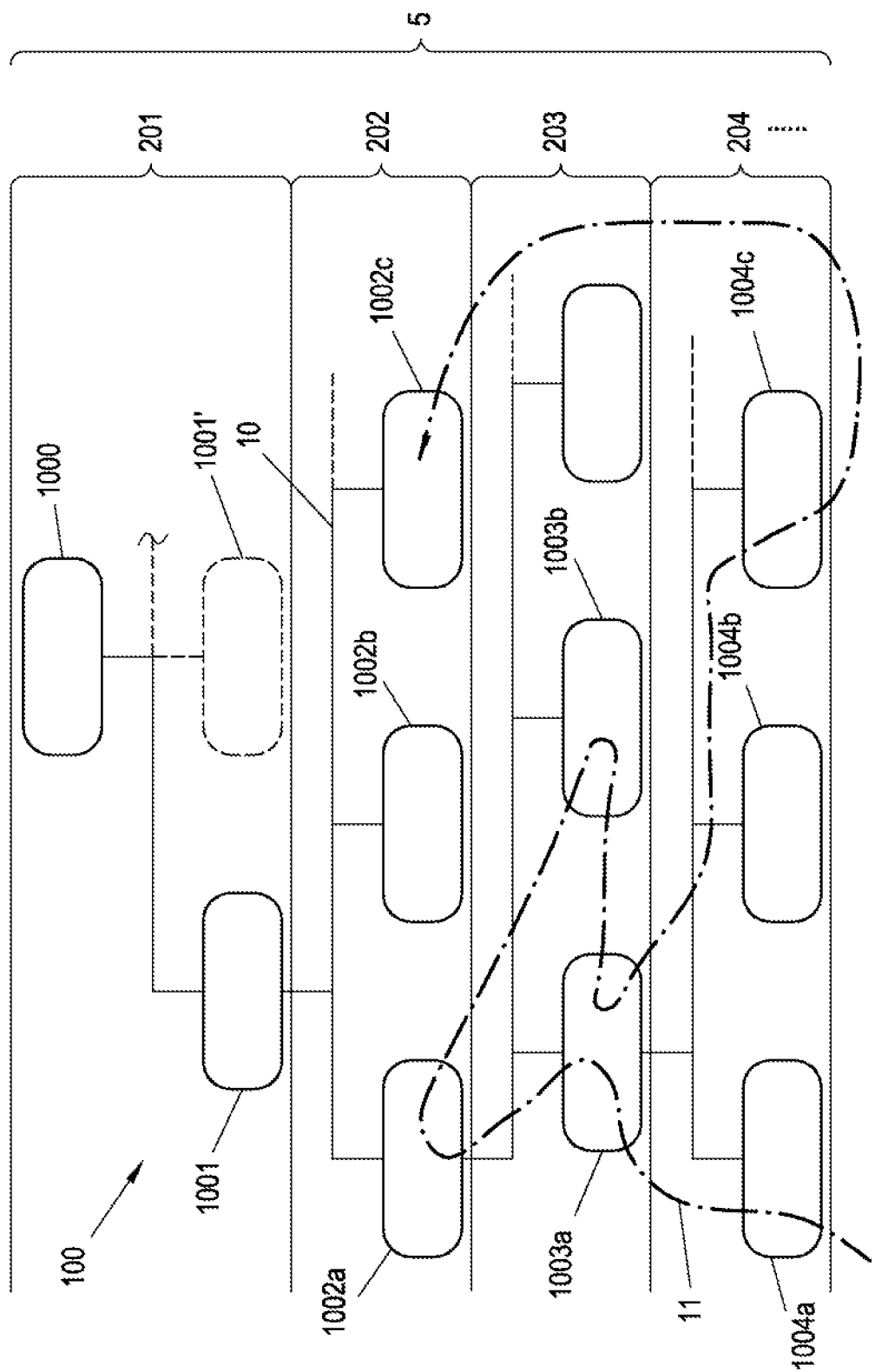
FIG. 3 shows a block diagram of the initial instance of the model, with a data flow also being shown.

The properties disclosed in connection with the description of FIGS. 2 and 3 can also be applied accordingly to all model variants described below that are developed from the initial instance 100 of the model 5. In iterative specification processes, unknowns and placeholders are replaced by specific features, as is described below with reference to FIGS. 4 and 5.

Figure 4:
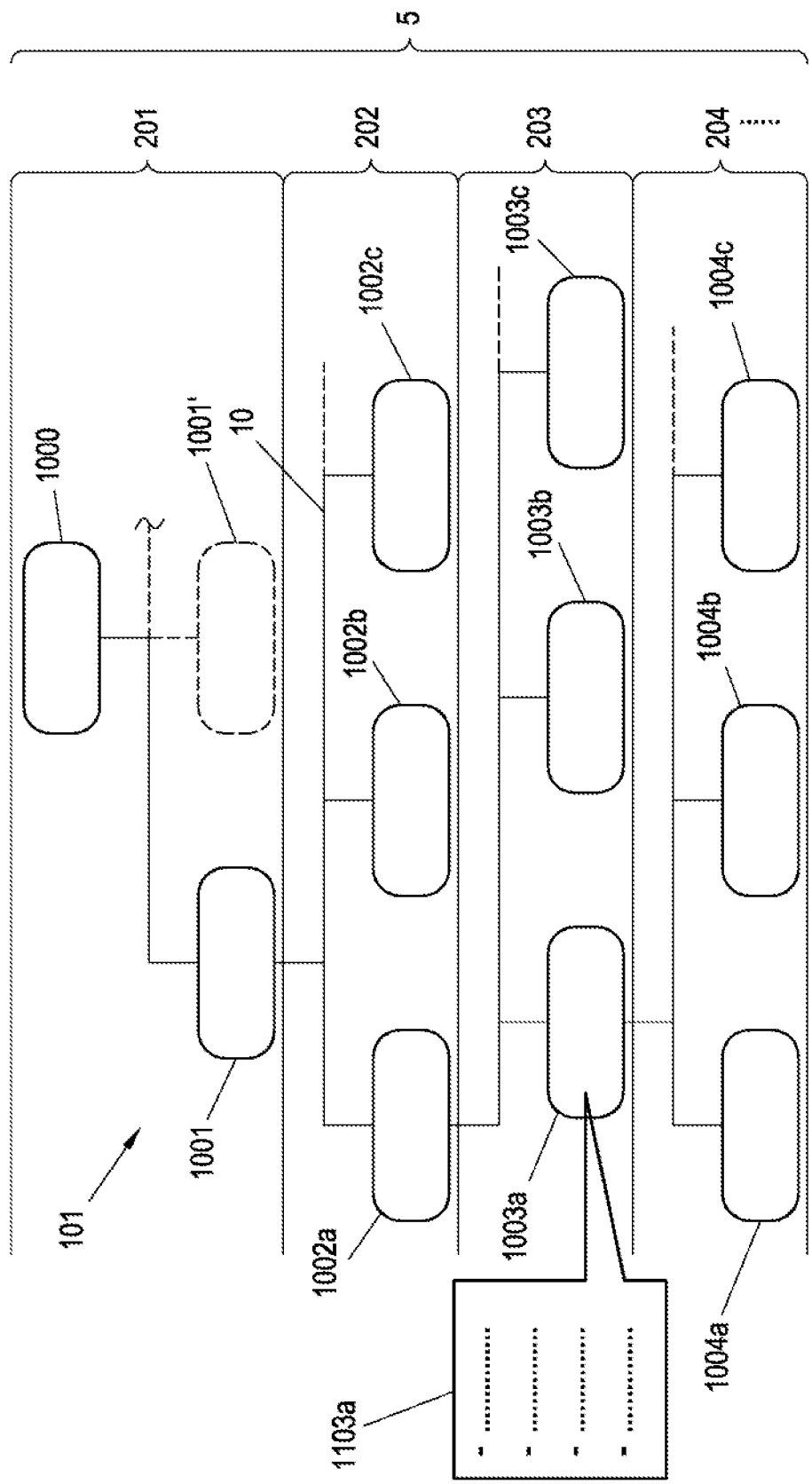
FIG. 4 shows a block diagram of a specified instance of the model which has been supplemented with additional information about features of the configuration of the technical unit.

FIG. 4 shows a block diagram of a specified instance 101 of the model 5, the specified instance 101 having been supplemented with additional information (which is shown schematically in FIG. 4 as an information block 1103*a*) about the sub-component of the model node 1003*a*. The information block can contain for example information about a connection protocol used, a type designation, a development stage, software and software version used, a type designation and further information about a CPU or a microcontroller, etc.

One way of initially obtaining additional information can be a user query, for example. The user can determine by means of a visual inspection, for example, whether a certain component is installed in the technical unit 1, provided this can be detected by means of a visual inspection. Further information can be carried out by the test computer system 2 by means of specification processes, either partially or fully automatically via the test interface 6. "Partially automatically" refers to a specification process that requires user intervention, whereas a fully automatic specification process does not require any user intervention.

To carry out partially and fully automatic specification processes, the test computer system 2 can perform scans, for example, using methods known from reverse engineering. Examples of such scans include:
- determining implemented connection protocols and their version by protocol sniffers,
- measuring additional attributes, such as latency, and determining details of the implementation of the connection protocols (software, hardware),
- detecting components and/or protocols via specially designed data communication (challenge action)
- detecting software by searching memory (RAM, Flash, etc.) and using pattern matching to determine the signatures of known software components,
- examining the program sequence structure in already compiled software ("control flow integrity checks"), whereby e.g. known error analysis tools such as Valgrind can be used.

If necessary, additional information for the above scans can be obtained from the user through expert knowledge. This is particularly advantageous for technical units that are still in an early development phase or for which only limited empirical values are available.

Whenever, on the basis of a result of a scanning process, a characteristic behavior is detected that allows a conclusion to be drawn about at least one feature of the actual configuration of the technical unit 1, the model 5 is specified with this information. Thus, by applying the automatable scanning processes, the available information about the configuration is expanded step-by-step and mapped in the specified instances 101 of the model 5 that are developed step-by-step.

A scanning process can either analyze and evaluate a response that was triggered by a challenge action, or a behavior of the technical unit 1 that was triggered by the technical unit 1 itself and did not occur in response to a challenge action can be evaluated. For example, the data traffic on a data bus (for example a CAN bus of a vehicle) can be "intercepted" purely passively by the test computer system 2. The data communication events occurring on the bus can then be analyzed and evaluated in order to be able to make inferences regarding features of the technical unit. Such "interception" of data communication events is possible without a challenge action, but the knowledge that can be achieved therewith is limited. In order to obtain further information, an attempt can therefore be made to trigger the data communication in a targeted manner by means of a challenge action. The challenge action can consist, for example, in the test computer system 2 generating its own data traffic on the data transmission device 3 and analyzing and evaluating the responses thereto. However, more complex challenge actions can also take place, for example by user actions being carried out which are predetermined by the test computer system 2.

The specification processes can be carried out by the test computer system 2 until the complete configuration has been found. This is not usually possible within a specified time, however, and so the specification processes are ended as soon as a certainty condition is met. The result is a refined, concretized model that may still contain gaps, but that has a significantly higher level of detail than the initial instance 100 of the model. The certainty condition may consist in the fact that the proportion of unidentified features falls below a certain proportion, for example. If necessary, the individual features can be weighted with regard to their relevance, and the certainty condition can be met if the total weight of the unidentified features falls below a predetermined value. As an alternative or in addition, the certainty condition can include other criteria, for example a certain test time or, for example, the success of the specification steps last carried out can also be assessed. As long as the specification steps successfully generate new information, the specification processes continue. If the effort for the specification processes is offset by only minor progress, possibly in combination with further certainty conditions, the specification processes can be ended.

The model developed with the aid of the specification processes (i.e. the most complete version of the specified instances 101 of model 5) is referred to in connection with the present disclosure as a "first plausible model variant 102."

Figure 5:
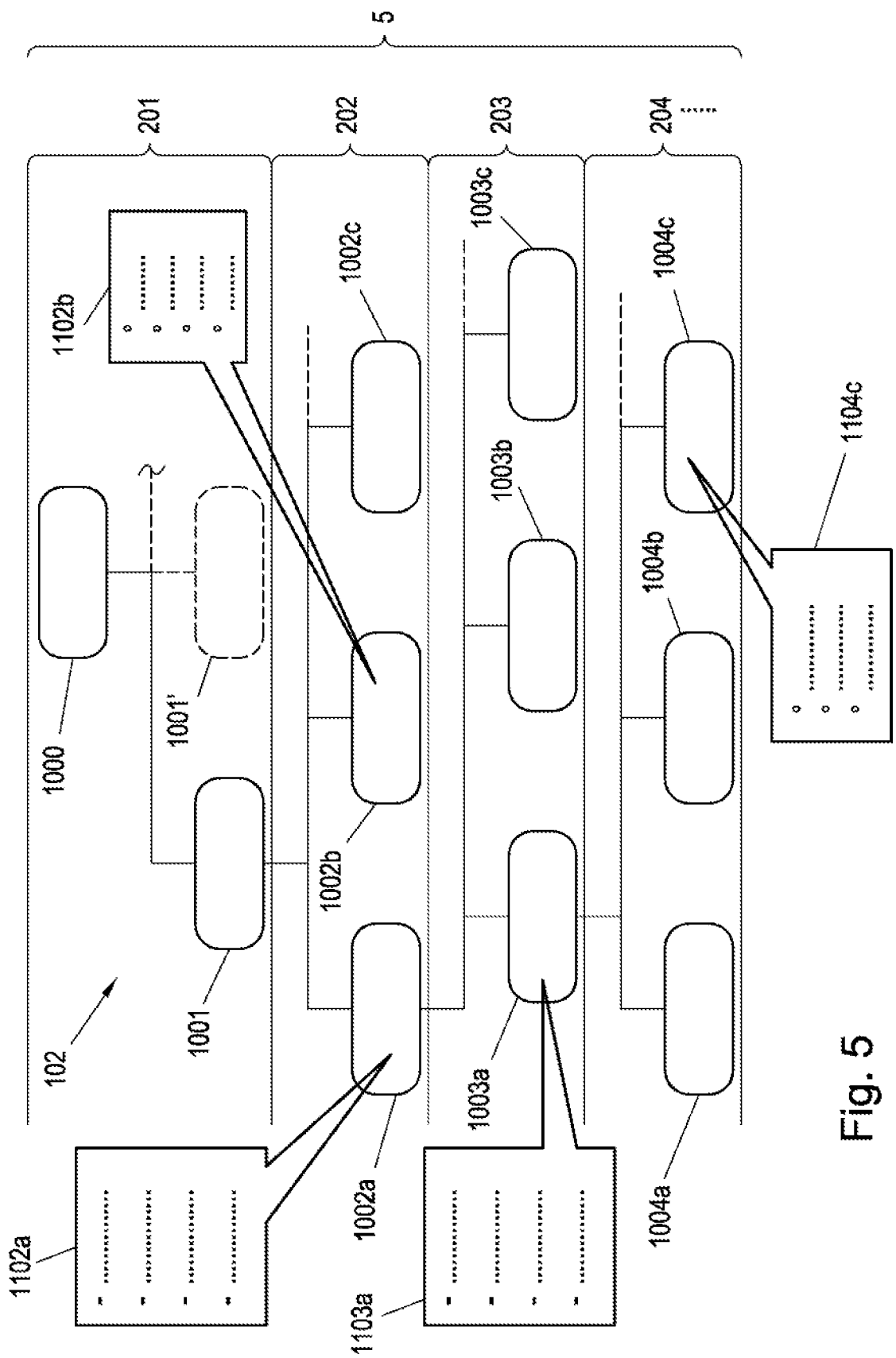
FIG. 5 shows a block diagram of a first plausible model variant of the technical unit.

FIG. 5 shows a schematic block diagram of such a first plausible model variant 102 of the technical unit 1. Certain information could be determined for the model nodes 1002*a*, 1002*b*, 1003*a* and 1004*c*, as is shown by the information blocks 1102*a*, 1102*b*, 1103*a* and 1104*c*.

The proportion of specification processes that can be carried out fully automatically by the test computer system 2 increases with the number of tests carried out on similar or identical technical units 1, since in this case databases of possible configurations are expanded, enabling an increasingly automatic method sequence. It is therefore a learning system. As soon as an initial learning phase has been overcome and sufficient information has been stored in the databases, increasingly complex tasks can be carried out automatically in less time.

Figure 6:
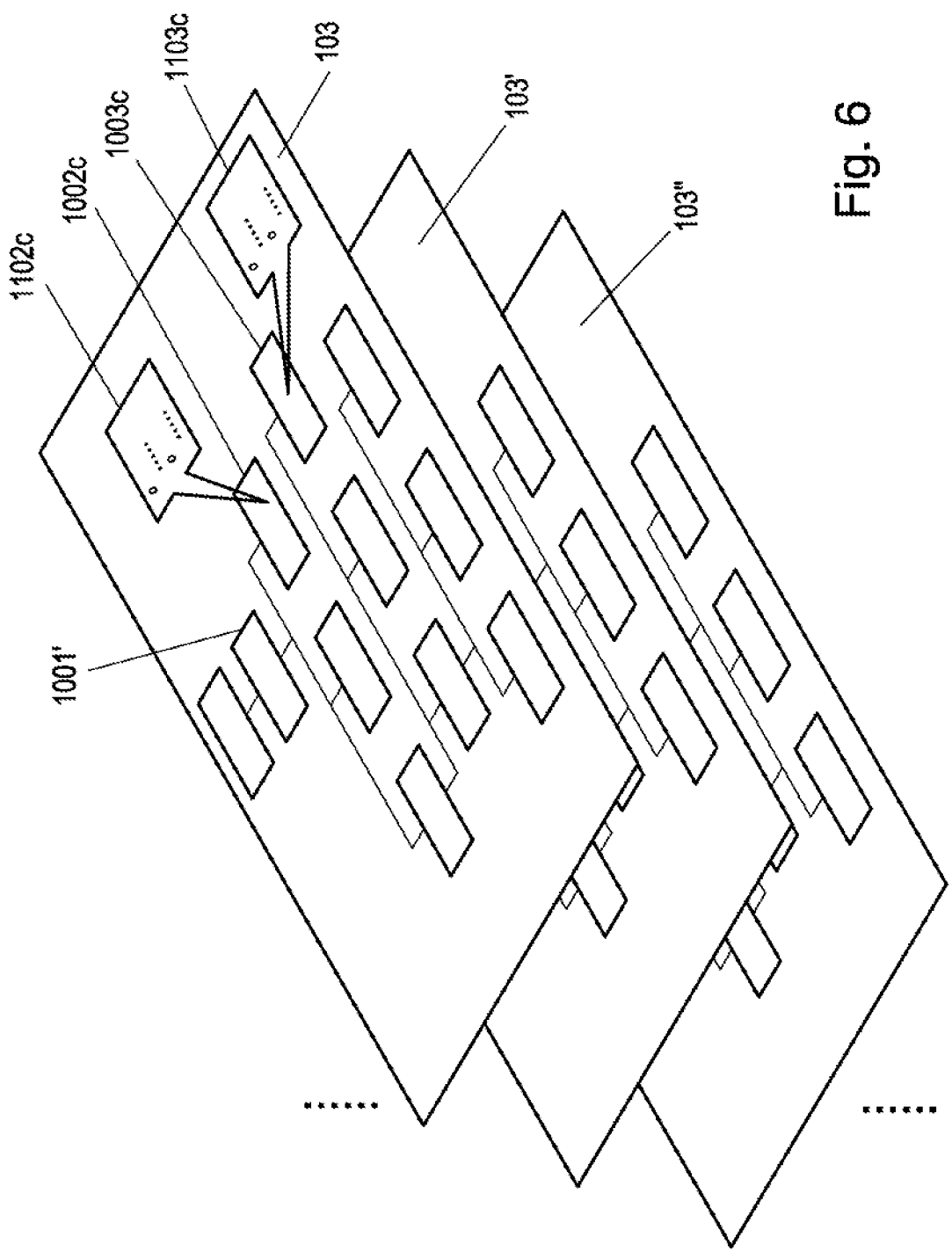
FIG. 6 shows a block diagram of a multitude of alternative model variants which were created on the basis of the first plausible model variant.

As soon as a first plausible model variant 102 has been identified, further detailing takes place speculatively. This is shown in FIG. 6 by way of example. FIG. 6 shows multiple alternative model variants 103, 103' and 103", shown as superimposed levels, which are created on the basis of the first plausible model variant 102. When creating the alternative model variants 103, firstly all missing features that are relevant for a security check are determined. Thereafter, multiple speculative assumptions are made for each of these features, each of which represents a possible implementation. An alternative model variant is then created for each of the possible combinations of features based on these assumptions.

For example, in the case of the first plausible model variant 102, it might not be known which specific implementation was used as the TCP/IP stack in a specific control unit (e.g. a control unit represented by the model block 1003*c*). For this reason, N assumptions are now made with possible implementations. If this is the only unknown of the first plausible model variant 102, this results in exactly N alternative model variants. However, it is usually necessary to create possible implementations of multiple unknown features, with a number of possible implementations (M, O, . . . ) being created for each of these features. The total number of alternative model variants is thus the product of the number of the respective alternative model variants (N×M×O . . . ). The total number of alternative model variants 103 thus usually reaches an order of magnitude that can be examined and tested only by powerful test computer systems 2. In contrast with the starting point, the initial instance 100 of the model, the object can be achieved in a given time, since the first plausible model variant 102 meets the certainty condition.

After the alternative model variants have been created, the actual security check of the technical unit 1 can take place.

Figure 7:
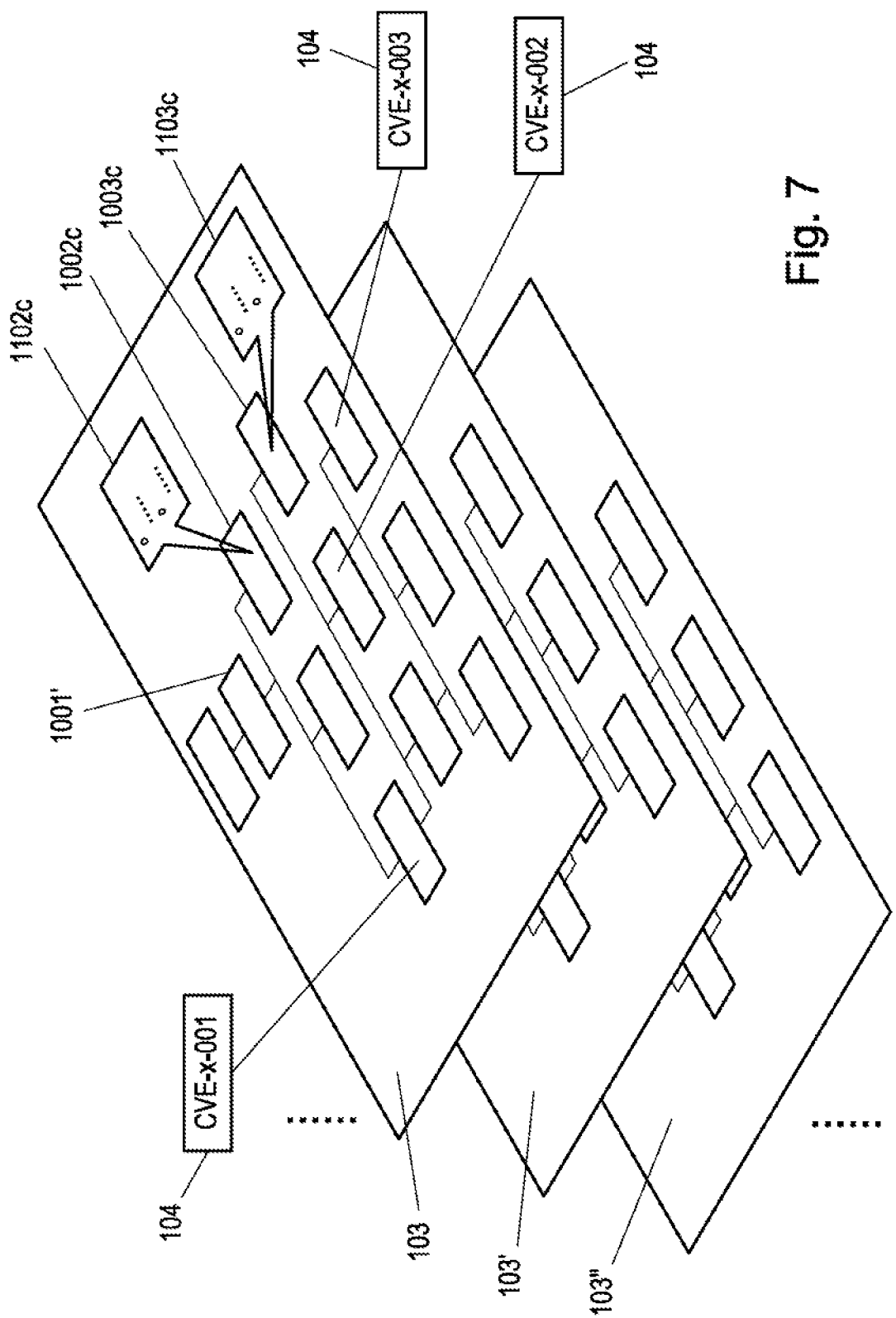
FIG. 7 shows a block diagram according to FIG. 6, with references to known vulnerabilities being given in the model variants.

For this purpose, known vulnerabilities are assigned to the individual alternative model variants 103. The identified features and the assumptions made are compared with collections of known vulnerabilities. Such collections may be available on the Internet free of charge or for a fee (for example: http://cve.mitre.org/ or https://www.automotiveisac.com/) and/or internal collections from manufacturers, associations, etc. can also be used. After this assignment, a multitude of alternative model variants 103 are obtained, each of which is assigned known weak points. FIG. 7 shows a block diagram of the alternative model variants shown in FIG. 6, according to which multiple references 104 to known vulnerabilities are given and assigned to a particular model node. If necessary, multiple vulnerabilities can be assigned to one model node and one vulnerability can also be assigned to multiple model nodes.

Furthermore, an attack aim is defined, or the attack aim can be selected from a list of attack aims to be processed. The implementation of the security check is described below in connection with this one attack aim. If necessary, however, the security check can also include multiple attack aims, in which case it is then processed in an analogous manner for each attack aim.

Based on the attack aim, an attack model which takes into account the known vulnerabilities for the individual model nodes is created for each alternative model variant. Each node in this attack model usually corresponds to a node in the relevant model variant. The vulnerabilities (and any countermeasures implemented) determine the effort required to compromise a node and thus overcome it as an obstacle on the path to the attack aim (see below). The hierarchical structure of the attack models allows, for known model nodes, to fall back on attack models that have already been developed for this model node, and to use these in the relevant attack model.

If necessary, "speculative vulnerabilities" can also be taken into account, for example for nodes for which there is no known vulnerability, but for which it is suspected (e.g. by experts) that such a vulnerability could be found in a reasonable time. A speculative vulnerability can then be assigned to this node. Speculative vulnerabilities are used to allow tests even if the vulnerability databases are still incomplete and poorly populated. Speculative vulnerabilities can be tested for example using special techniques to find vulnerabilities about which there is no prior knowledge, for instance by using fuzzing.

The nodes of the attack model are each weighted by an evaluation variable with regard to effort, which assigns the node an effort to overcome it, for example in money, manpower, time, other resources, etc. For the defined attack aim, an evaluation can then be carried out for each path of the attack model (i.e. for each test vector) using the vulnerabilities known at the relevant node and the relevant evaluation variable.

It is not necessary, however, to calculate an evaluation of each individual test vector of each alternative model variant for the security check, since only the pessimal value of all test vectors is of interest. The evaluation of a test vector can therefore be aborted or omitted if it is clear that the evaluation of this test vector will be higher than the previously determined pessimal value. For example, the evaluation of test vectors that have a node that has a better evaluation than the previously determined pessimal value of an entire test vector can be dispensed with entirely. Such alternative test vectors may be relevant, however, if the specified model changes and therefore implies a re-evaluation of an attack model or its paths.

If an evaluation of a test vector is found that is below the security criterion that was defined for the security confirmation, the security check can either be aborted or measures can be recommended or implemented by the test computer system 2 that increase the security of the technical unit 1, for example a software or firmware update of one or more components. The security check can then be repeated with a redetermination of the model variants, although this time the features that have already been determined can be used from the beginning.

Otherwise, the evaluation of the test vectors is carried out until a pessimal value of all test vectors of all attack models of all alternative model variants has been determined. If this pessimal value (which can also be referred to as the security value) is above the previously defined security criterion, a security confirmation can be issued for the technical unit. In addition, recommendations can be made on how security can be further increased, for example by identifying protective measures such as software updates. The effects of such software updates on the achievable security value can optionally be tested in advance in a simulated security check. If necessary, after one or more protective measures have been carried out, a new security check can be carried out, in which the previously determined information can be used.

The steps of the security check can be carried out iteratively, with security measures being carried out as soon as a test vector has been found whose evaluation is below the security criterion, and the method is then continued on the basis of the new findings.

When carrying out the method, it must be borne in mind that many test vectors of the attack models that are based on the alternative model variants include nodes that are based on unconfirmed components or features, since the features were selected on the basis of speculative assumptions. As soon as a test vector is found in the multitude of alternative model variants that leads via a node with a speculative assumption, whereby the node reveals a vulnerability, an attempt can be made to exploit this vulnerability on the real technical unit 1 by executing a corresponding cyber attack by the test computer system 2. Confirmed nodes and test vectors can also be checked in this way (for example using appropriate tools such as penetration testers). This "actual" attack can then be used to validate the findings. Under certain circumstances it may even turn out that an attack is even easier than expected, and that the "costs" (i.e. the evaluation) are lower in reality. (For example, a default password may have been allocated that is easy to guess. In this case, there is no need to apply brute-force trial and error).

For example, a particular component (affecting a node of a test vector) may be known to be vulnerable to a DDoS attack. The test computer system 2 can then carry out such a DDoS attack in accordance with an exploit based on the test vector. If the cyber attack is successful in this way, all model variants for which the corresponding test vector does not have this vulnerability can be eliminated. If only a single model variant is left here, conclusions can be drawn about further actual features of the technical unit 1. As a result, the variety of alternative model variants can be significantly restricted and, if necessary, it may even be possible in this way to completely map the configuration of the technical unit 1 in the model (i.e. there is then only one alternative model variant whose full correspondence with the technical unit 1 has been confirmed). The use of exploits can be of additional relevance to check the actual implications of a vulnerability; for example, a vulnerability may not be exploitable due to slight changes in the configuration of a piece of software or due to additional protective measures, although the software would in principle be affected by this vulnerability.

A successfully executed cyber attack can usually fully identify the entire chain of components that are affected by the nodes of the test vector.

As soon as no more test vectors with a rating below the security criterion are found, the system can be regarded as "sufficiently secure" and a security confirmation is issued.

With every security check, the knowledge gained is evaluated and stored in appropriate databases for future security checks. If, for example, test vectors are found that enable a cyber attack (i.e. vulnerabilities), corresponding test cases, test vectors and possibly exploits can be automatically generated therefrom, and can be used in future security checks of similar technical units.

In connection with the present disclosure, a "test case" is an automated sequence of test steps that is based on patterns that were detected during previously performed security checks on similar technical units. Such test cases can significantly shorten the method disclosed herein. For example, on the basis of previous security checks, it may be known that a certain type or a certain model of a technical unit is often susceptible to certain test vectors. With the help of the test cases, appropriate exploits can now be carried out in the course of the modeling, the success or failure of which allows conclusions to be drawn about the actual configuration of the technical unit. The exploits of a test case can be viewed in connection with the present disclosure as a "challenge action," with the result representing the characteristic behavior of the technical unit.

The procedure described above allows the implementation of a largely automated test execution and test evaluation, with it being possible to detect functional and non-functional errors or general irregularities in the technical unit 1.

In the course of the security check (or as a result of same), security and/or improvement measures can be proposed if necessary and also tried out if necessary. The proposals result from fictitiously assumed or simulated changes to the configuration that alter the attack model or at least one test vector thereof, e.g. a software update of a component represented by a node. The proposed improvement measure can be validated, for example, in the following three forms:

simulation on the attack model (purely computationally in the model)

simulation in a simulation environment (i.e. the technical unit is at least partially mapped in virtual simulation systems that are simulated with the software versions running on it)

testing on the actual test unit (for example on a physical vehicle in a test bench), wherein individual components of the technical unit may be replaced by virtual equivalents in the form of (co-)simulation.

The validation then takes place in accordance with the method for security checking disclosed herein, with the partially or fully simulated technical unit taking the place of the real technical unit.

The methods described herein make it possible to automatically find test cases for the security check, to prioritize them, to identify associated test vectors and to generate exploits, to define an automated implementation of the security check and to automatically support the evaluation of the test results. As a result, the greatest possible test success can be achieved with limited (i.e. predetermined) test resources (for example a maximum test time). This means that as many of the relevant (high-priority) vulnerabilities in the overall system (i.e. the technical unit) as possible can be identified with the highest possible probability.

The method also makes it possible, under given circumstances (e.g. in the course of "black box testing"), to identify the relevant test vectors and to select or generate the necessary test cases if no or incomplete information about the technical unit is available at the beginning (e.g. missing details about the system architecture, the dependencies of the components and sub-components, the features of the components, the known vulnerabilities, etc.).

REFERENCE SIGNS

Technical unit 1
Test computer system 2
Data transmission device 3
Component 4
Model 5
Test interface 6
Connection edges 10
Initial instance 100
Specified instance 101
First plausible model variant 102
Alternative model variant 103
References 104
Identification level 201
Component level 202
Sub-component level 203
Interaction level 204
Model node 100$x$
Information block 110$x$

The invention claimed is:

1. Method for checking the security of a technical unit, the technical unit comprising at least one data transmission device and a multitude of components being capable of data communication via the data transmission device wherein at least one first plausible model variant is determined from an initial instance of a configuration model of the technical unit by specification processes, wherein each configuration model and each model variant corresponds to a systematic representation of the configuration of the technical unit, wherein the first plausible model variant corresponds to a certainty condition, wherein the certainty condition establishes that an instance of the model is sufficiently certain to allow a security check to be carried out within a specified time, wherein the method is carried out on a test computer system and wherein the method comprises the following steps:
- assigning known vulnerabilities to components of the model variants;
- defining an attack aim by selecting the attack aim from a list of attack aims to be processed;
- determining at least one attack model, based on the attack aim, for the model variants;
- weighting the nodes of the attack model with respect to at least one evaluation variable;
- determining an evaluation of at least one test vector of the attack model with respect to the evaluation variable;
- determining a security value as the pessimal value of all evaluations; and
- issuing a security confirmation if the security value corresponds to a security criterion.

2. The method according to claim 1, wherein the at least one first plausible model variant is determined according to the following method for determining at least one first plausible model variant of a configuration of the technical unit by means of the test computer system, the method comprising the following steps:
- establishing a connection between a test interface of the test computer system and the data transmission device of the technical unit;
- determining an initial instance of a model of the configuration of the technical unit, wherein the initial instance of the model is a generic model or more specific model of the technical unit;
- developing specified instances of the model starting from the initial instance through a sequence of specification processes, each of which has at least the following steps:
  - carrying out a challenge action, wherein the challenge action comprises an action configure to cause a characteristic behavior of the technical unit,
  - determining a behavior which is characteristic of the technical unit by intercepting a data communication via the data transmission device or by another measurement,
  - analyzing the characteristic behavior and inferring at least one feature of the actual configuration of the technical unit, and
  - specifying the model with the at least one determined feature, wherein at least one specification process is carried out automatically by the test computer system; and
- identifying a specified instance of the model as a first plausible model variant if at least one certainty condition is met, wherein the at least one certainty condition comprises a predetermined percentage of the technical unit's features being incorporated into the model, a set number of specification processes yielding no new features, a time limit for specification processes being reached, or the model achieving a predetermined complexity threshold based on identified components and their relationships.

3. The method according to claim 2, wherein the step of determining a behavior which is characteristic of the technical unit includes the interception of data transmitted via the data transmission device by the test computer system.

4. The method according to claim 2, wherein features of the actual configuration of the technical unit are selected from at least one feature of a component.

5. The method according to claim 2, wherein at least one alternative model variant is created on the basis of the determined at least one first plausible model variant.

6. The method according to claim 2, wherein the actual configuration of the technical unit are selected form at least one relationship between components.

7. The method according to claim 1, wherein the method further comprises the following steps:
- carrying out at least one cyber attack on the technical unit, selected on the basis of the identified vulnerabilities,
- evaluating the effect achieved with the cyber attack, and
- eliminating model variants for which the effect achieved is inconclusive.

8. The method according to claim 1, wherein the method further comprises the following steps:
- determining at least one piece of software and/or firmware that is installed on a component of the technical unit, and
- specifying the software with the test computer system.

9. The method according to claim 1, wherein the method further comprises the following steps:
- determining a piece of software that is installed on a component of the technical unit,
- creating simulated model variants that contain a specified version of the software, and
- determining a security value on the basis of the simulated model variants.

10. The method according to claim 1, wherein the technical unit is an autonomous vehicle according to one of the SAE levels 0 to 5 according to the SAE J3016 standard.

11. Method for determining at least one first plausible model variant of a configuration of a technical unit by means of a test computer system, wherein the technical unit comprises at least one data transmission device and a multitude of components which are capable of data communication via the data transmission device, and wherein the method comprises the following steps:
- establishing a connection between a test interface of the test computer system and the data transmission device of the technical unit;
- determining an initial instance of a model of the configuration of the technical unit by intercepting a data communication via the data transmission device or by another measurement;
- developing specified instances of the model starting from the initial instance through a sequence of specification processes, each of which has at least the following steps:
  - carrying out a challenge action, wherein the challenge action comprises an action configure to cause a characteristic behavior of the technical unit,
  - determining a behavior which is characteristic of the technical unit by intercepting a data communication via the data transmission device or by another measurement,
  - analyzing the characteristic behavior and inferring at least one feature of the actual configuration of the technical unit, and
  - specifying the model with the at least one determined feature, wherein at least one specification process is carried out automatically by the test computer system; and identifying a specified instance of the model as a first plausible model variant if at least one certainty condition is met, where the certainty condition establishes that the first plausible model variant is sufficiently certain to allow a security check to be carried out within a specific time, wherein the at least one certainty condition comprises a predetermined percentage of the technical unit's features being incorporated into the model, a set number of specification processes yielding no new features, a time limit for specification processes being reached, or the model achieving a predetermined complexity threshold based on identified components and their relationships.

* * * * *